Patented May 27, 1930

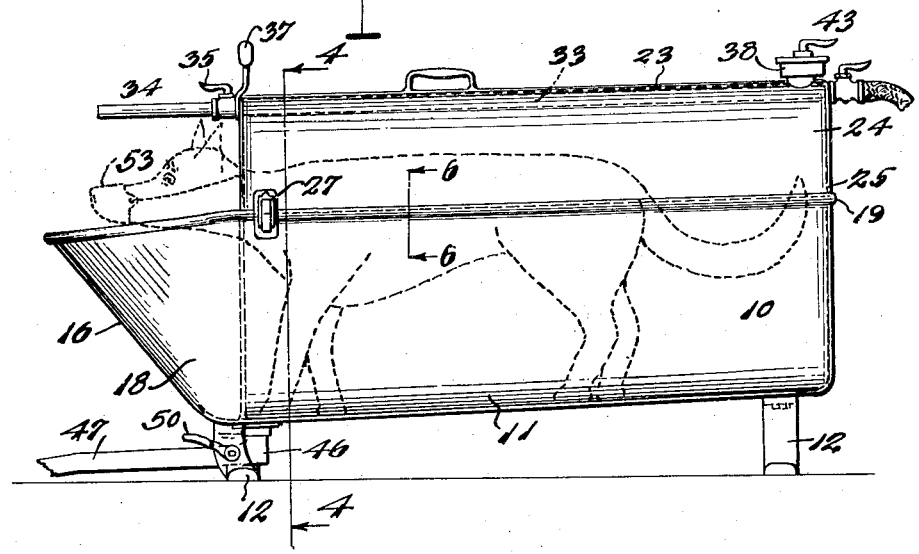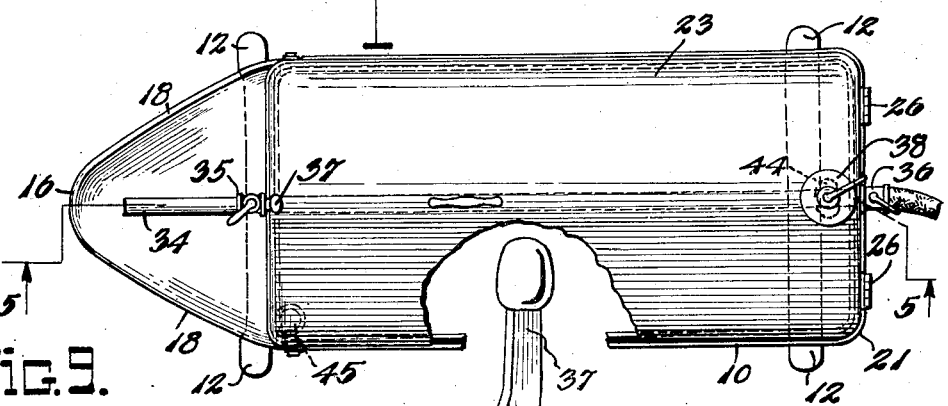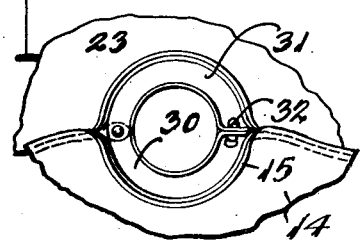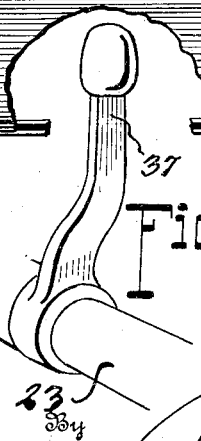

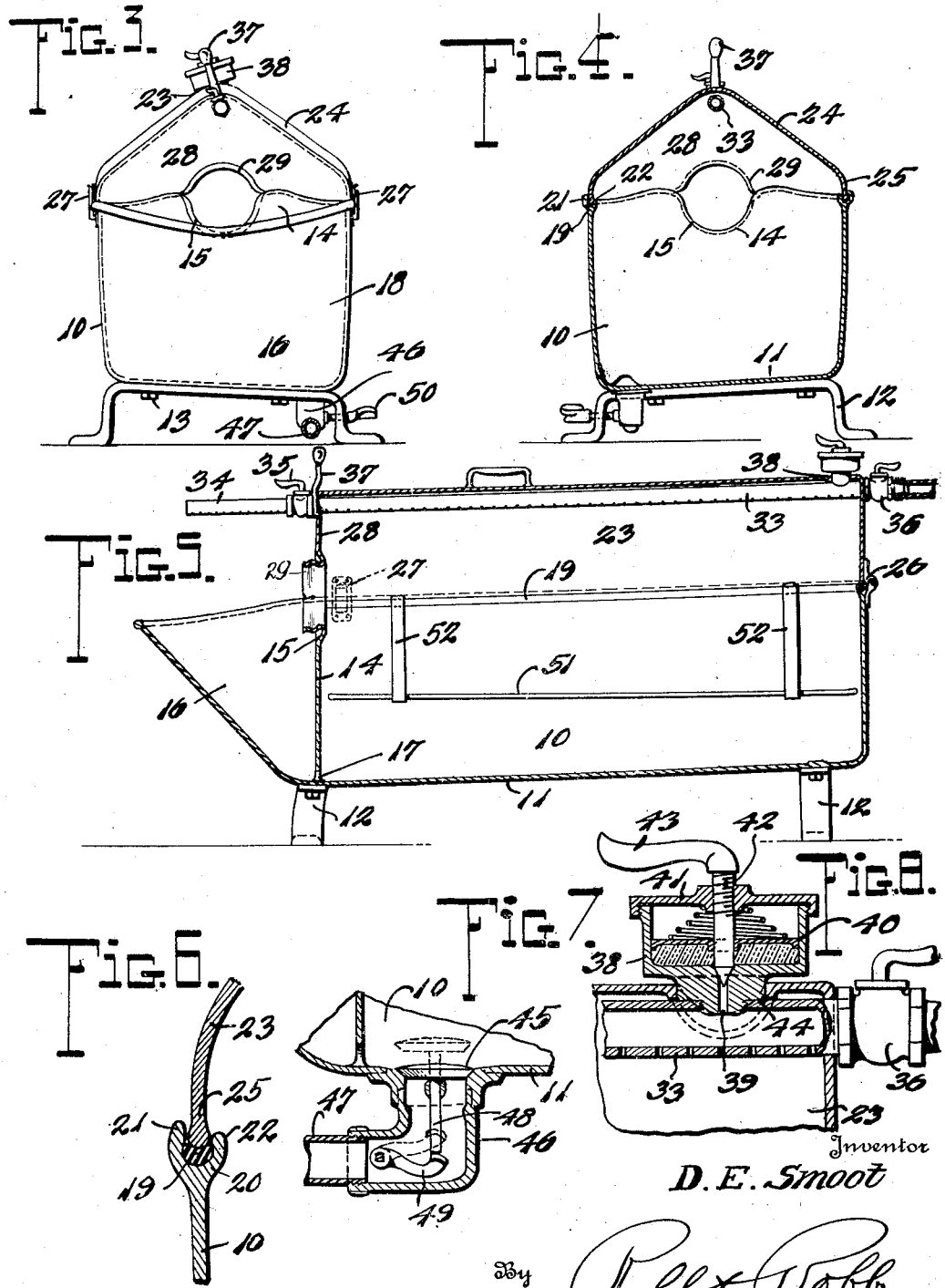

1,760,017

UNITED STATES PATENT OFFICE

DAISY ELLEN SMOOT, OF APOPKA, FLORIDA

ANIMAL BATH

Application filed May 11, 1928. Serial No. 277,030.

This invention relates to an animal bath and particularly to a construction adapted for bathing domestic animals and protecting the user during such operation.

In the use of an ordinary open tub the bathing liquid and soap or insecticide must be applied by hand and the person bathing the animal is exposed to the splashing water. This renders the operation both disagreeable and inconvenient, particularly if performed in a furnished room, which is often necessary in the case of apartment houses and hotels. It has also been found quite difficult to retain the animal in the desired position during the bathing operation so that after the application of a detergent the same may be rinsed off and the flow carried in such direction as to thoroughly cleanse the hair of the animal. To obviate these objections and provide an efficient construction for bathing domestic animals I have provided a tub having a closure adapted to receive the animal with its head projected therefrom and also to introduce a liquid spray upon the back of the animal so that it will flow downwardly to the water in the lower portion of the tub. I have also provided means by which a proper detergent or insecticide may be introduced into the liquid pipe during the period desired and have further provided this pipe with an extension by which the head of the animal may be independently washed and the falling water therefrom caught by a trough in communication with the tub.

The invention has for an object to provide a novel and improved construction comprising a tub with a closure therefor having a head opening at one end and a liquid discharge pipe within the closure.

A further object of the invention is to provide an arched closure for the tub having a spray pipe at its apex and an extension therefrom disposed above a trough communicating with one end of the tub.

Another object of the invention is to provide the liquid spray pipe with suitable control means so that the portion thereof within the closure may be used or the extension therefrom together with means for introducing into this pipe a reagent to be used in the washing operation.

Other and further objects and advantages of the invention will be hereinafter set forth and the novel features thereof defined by the appended claims.

In the drawings:

Fig. 1 is a side elevation;
Fig. 2 is a top plan with part broken away;
Fig. 3 is an elevation at the left end of Fig. 7;
Fig. 4 is a section on line 4—4 of Fig. 1;
Fig. 5 is a section on line 5—5 of Fig. 2;
Fig. 6 is a detail section on line 6—6 of Fig. 1;
Fig. 7 is a detail section of the outlet valve;
Fig. 8 is a similar view of the receptacle for a detergent;
Fig. 9 is a detail elevation of the holding collar at one end of the tub; and
Fig. 10 is a detail perspective of the lever for rotating the spray pipe.

Like numerals refer to like parts in the several figures of the drawings.

The invention may be embodied in a tub of any desirable size or configuration suitable to the use for which it is to be applied. In the form shown the numeral 10 designates the tub which has its bottom 11 inclined both longitudinally and transversely and may be conveniently supported by means of detachable legs 12 secured by removable fastenings such as 13. The tub is formed at one end with a wall 14 having at its upper edge a recess portion 15 to receive the neck of the animal occupying the tub whose head projects over the trough 16 which communicates by an opening 17 with the body of the tub. This trough is inclined from each side toward the center as at 18 in Fig. 2 and also tapers downwardly.

The upper edge of the tub 10 is formed with a recess 19 adapted to receive a packing material 20, such as rubber, while the outer wall 21 of the recess is of greater height than the inner wall 22 so that liquid flowing downwardly from the cover 23 will be discharged into the tub, as shown in Fig. 6.

This cover is of substantially arched shape and the opposite inclined walls 24 thereof terminate in free edges 25 aligned with the tub and resting upon the packing 20 before described. This cover or closure may be mounted upon the tub in any desired manner but it is preferably pivoted at one end of the tub, as at 26, and provided with a suitable latch 27 to retain it in closed position. The end 28 of the cover aligned with the wall 14 of the tub is formed with a recessed or notched portion 29 cooperating with the portion 14 of the tub wall to fit about the neck of the animal. The edges of the openings formed by the recessed portions 15 and 29 may be provided with recesses for engaging a flexible collar 30 to prevent the liquid from splashing out around the collar, the lower portion thereof being secured to the wall of the recess 15 and the upper member 31 being movable when the cover is opened. This permits the collar to be fitted about the neck of the animal and secured by a suitable device, as at 32, so as to hold the animal in proper position when the cover is lowered to enclose it within the tub.

For the purpose of supplying liquid to the tub and spraying the same upon the back of the animal a pipe 33 is mounted at the apex of the cover and extends beyond the opposite ends thereof, with the portion 34 controlled by the valve 35 disposed above the trough 16 for the purpose of washing the head of the animal during the spraying action if desired. The inlet to this pipe is controlled by a suitable valve 36 and the pipe is rotatably mounted in the cover so that the spray apertures thereof may be directed in directions to thoroughly apply the liquid to the animal. This rotation may be effected by means of a handle 37 secured to the pipe.

For the purpose of introducing a detergent or an insecticide into the spray pipe in order to mix and apply the same with the liquid, this pipe is provided with a cup 38 having a feed aperture 39 to the spray pipe and a spring actuated plunger 40 for ejecting the contents of the cup into the pipe. This spring is tensioned by the application of the cover 41. When the reagent within the cup is not to be applied, for instance in the rinsing operation, the outlet 39 may be closed by a valve 42 threaded into the cover and entering said outlet at its lower end. By a movement of a handle 43 of this valve it is withdrawn from the opening 39 and the reagent continuously discharged therefrom into the entering stream of water. Other forms of applying a soap or a medically treated detergent may be applied to the pipe. For the purpose of permitting the swinging of the pipe by its handle the cover is formed with an elongated slot 44 through which the connector from the cup extends.

For the purpose of conveniently discharging the liquid from the tub after its use and effecting a complete drainage thereof a discharge valve 45 is disposed at one end thereof which comprises the low point of the longitudinal and transverse inclination of the bottom 11. This valve is disposed in a coupling 46 for a discharge pipe 47 and the stem 48 of the valve is operated by a lever 49 adapted to be controlled by a foot pedal 50 upon its shaft.

When the tub is used for smaller animals than ordinarily designed, an open support 51 may be suspended from the sides of the tub by the strap 52 so as to bring the head of the animal into proper position so that its neck may be enclosed by the cover. Under certain conditions it is desired to provide a water proof muzzle for the nose of the animal and such is indicated at 53 in Fig. 1.

The operation of the invention will be apparent from the foregoing description, from which it will be seen that the animal when confined within the tub by the cover has its head projected and the liquid is applied through the spray pipe for the usual washing operation, at which time a detergent or proper insecticide is applied to cleanse the hair and remove insects therefrom. In case it is not desired to wash the head of the animal at the same time the extension may be cut off or it may be used for any limited period sufficient to apply some of the detergent to the head. After a suitable period of washing the liquid from the tub is withdrawn and the discharge valve again closed and also the valve for the reagent receptacle so that a rinsing of the animal with clear water may be effected. The person operating the tub is thus at all times protected from splashing water or contact with the detergent, and even after the final draining of the tub if the animal is left therein for a short period it will free itself from adhering water by shaking itself in the usual manner. The construction of the joint between the tub and its closure is such as to prevent leakage of water into the room for even if the spray be turned to one side the water flowing down the wall of the cover will pass over the lower wall of the recess and be discharged into the tub.

The invention, therefore, presents a simple, efficient and economically manufactured bathing apparatus for domestic animals, particularly adapted for use in apartments, hotels, or other places where it is important to protect the room from splashing water, and it also avoids the necessity of the operator manually applying a detergent to the animal and rinsing the same.

While the specific construction of the several parts has been shown and described, the invention is not confined thereto, as changes and alterations may be made without departing from the spirit of the invention as defined by the following claims.

What I claim is:

1. In an animal bath, a tub having a recessed end wall, an arched closure for said tub having an end wall provided with a recess for cooperating with the recess in the tub wall, a liquid supply pipe disposed within the closure to discharge upon the occupant of the tub; a trough extended from the end of the tub beneath said recesses, and a spray pipe disposed above said trough.

2. In an animal bath, a tub having a recessed end wall, an arched closure for said tub having an end wall provided with a recess for cooperating with the recess in the tub wall, a liquid supply pipe carried by the closure to discharge upon the occupant of the tub, and a separable collar disposed in the recesses of the tub and closure walls.

3. In an animal bath, a tub having its base inclined longitudinally and transversely, a closure mounted upon said tub, liquid spray means carried by said closure, a discharge valve for the tub provided with an operating lever, an extension from the spray pipe beyond the closure, and a trough beneath said extension communicating with said discharge valve.

4. In an animal bath, a tub, an arched closure pivotally mounted upon the tub and provided with an opening at one end for the head of the occupant of the tub, a spray pipe disposed at the apex of said closure and provided with a controlling valve, means for oscillating said pipe, and an extension from said spray pipe provided with a controlling valve for controlling the flow in the extension.

5. In an animal bath, a tub, means carried by the tub for retaining an occupant therein with a portion of the body projecting from the tub, said means comprising a detachable collar, and a cover for said tub having a recessed portion for engaging the said collar to prevent splashing from emitting around the projecting portion of the animal, said cover enclosing the remainder of the body of the occupant.

6. In an animal bath, a tub having an inclined bottom and one end wall formed with a recess at its upper edge, an arched closure for the tub pivoted at one end thereof and having its opposite end wall formed with a recess cooperating with that of the tub and constituting means to hold an animal therein, a spray pipe disposed in the apex of said closure to discharge on the animal, a discharge valve for emptying the tub, a detergent receptacle in communication with said pipe, and means for feeding the detergent from the receptacle into said spray pipe.

7. In an animal bath, a tub having an inclined bottom and one end wall formed with a recess at its upper edge, an arched closure for the tub pivoted at one end thereof and having its opposite end wall formed with a recess cooperating with that of the tub, a spray pipe disposed in the apex of said closure, a discharge valve for the tub, means for feeding a detergent into said spray pipe, an extension from said spray pipe beyond the end of the closure, and a trough beneath said extension communicating with said discharge valve.

8. In an animal bath, a tub having a recessed end wall and an extended trough portion beyond said end wall in communication with the body of the tub, an arched closure for said tub provided with a recess for cooperating with the recess in the tub wall, a liquid supply pipe disposed within the closure to discharge on an occupant of the tub and provided with an extended discharge section arranged over the trough portion, a valve for said extended section, means for feeding a detergent into said supply pipe, and a controlling valve for regulating the rate of feed of said detergent.

9. In an animal bath, a tub having a recessed end wall, an arched closure for said tub having an end wall provided with a recess adapted to cooperate with the recess in the end wall of the tub to engage the neck of an animal, constituting restraining means for said animal, a liquid supply pipe arranged within the closure to discharge upon the animal, said pipe being provided with an extended spray portion to discharge liquid upon the head of the animal, and a receptacle for supplying a detergent communicating with said supply pipe.

10. In an animal bath, a tub having a recessed end wall to receive the neck of an animal to be held thereby, an arched closure for said tub having an end wall provided with a recess for cooperating with the recess of the end wall of the tub to form a neck encircling splash guard, a liquid supply pipe disposed within the arched closure to discharge a liquid upon the occupant of the tub, said tub being formed with a groove around its upper portion adapted to receive the edge of the closure, the inner wall of said groove being lower than the outer wall, and a gasket member disposed at the bottom of said groove.

In testimony whereof I affix my signature.

DAISY ELLEN SMOOT.